US008248480B2

(12) United States Patent
Matsunaga et al.

(10) Patent No.: US 8,248,480 B2
(45) Date of Patent: Aug. 21, 2012

(54) IMAGING APPARATUS PROVIDED WITH PANNING MODE FOR TAKING PANNED IMAGE

(75) Inventors: Kazuhisa Matsunaga, Fussa (JP); Kouichi Nakagomi, Tokorozawa (JP); Tetsuji Makino, Oume (JP)

(73) Assignee: Casio Computer Co., Ltd., Tokyo (JP)

( * ) Notice: Subject to any disclaimer, the term of this patent is extended or adjusted under 35 U.S.C. 154(b) by 648 days.

(21) Appl. No.: 12/392,322

(22) Filed: Feb. 25, 2009

(65) Prior Publication Data
US 2009/0219415 A1 Sep. 3, 2009

(30) Foreign Application Priority Data

Feb. 29, 2008 (JP) ................ P2008-049168

(51) Int. Cl.
*H04N 5/225* (2006.01)
*H04N 5/228* (2006.01)
(52) U.S. Cl. ................ 348/218.1; 348/208.99
(58) Field of Classification Search ............ 348/208.99, 348/208.1, 208.4, 208.5, 208.13, 208.14, 348/218.1, 239
See application file for complete search history.

(56) References Cited

U.S. PATENT DOCUMENTS

| 7,468,743 | B2* | 12/2008 | Washisu | 348/208.1 |
| 2006/0007327 | A1 | 1/2006 | Nakamura et al. | |
| 2006/0062433 | A1 | 3/2006 | Ikeda | |
| 2007/0236578 | A1* | 10/2007 | Nagaraj et al. | 348/208.99 |
| 2008/0186386 | A1* | 8/2008 | Okada et al. | 348/208.4 |

FOREIGN PATENT DOCUMENTS

| JP | 2006-270238 A | 10/2006 |
| JP | 2006-339903 A | 12/2006 |
| JP | 2007-074031 A | 3/2007 |
| JP | 2007-081682 A | 3/2007 |

OTHER PUBLICATIONS

Japanese Office Action dated Jan. 19, 2010 and English translation thereof issued in a counterpart Japanese Application No. 2008-049168.

* cited by examiner

*Primary Examiner* — Kelly L Jerabek
(74) *Attorney, Agent, or Firm* — Holtz, Holtz, Goodman & Chick, PC (57) ABSTRACT

An imaging apparatus includes: an imaging section configured to acquire a plurality of images that are consecutively taken in time series by an imaging device; a reference region setting section configured to employ one of the images acquired by the imaging section as a reference image and to set a region of the reference image as reference region, the region having high-frequency components; and an image processing section configured to combine the images including the reference image by positioning the images so as to overlap subject portions in each images, the subject portions being defined in the reference region set by the reference region setting section.

20 Claims, 7 Drawing Sheets

IMAGING APPARATUS PROVIDED WITH PANNING MODE FOR TAKING PANNED IMAGE

CROSS-REFERENCE TO THE RELATED APPLICATION(S)

The present application is based upon and claims priority from prior Japanese Patent Application No. 2008-049168, filed on Feb. 29, 2008, the entire content of which are incorporated herein by reference.

TECHNICAL FIELD

The present invention relates to an imaging apparatus, such as a digital camera, which is suitably used in, for example, panning a moving object as a subject to be taken as well as a computer-readable storage medium containing a sequence of instructions for a program executable by a computer system used in the imaging apparatus.

BACKGROUND

There is proposed a technique that allows taking panned images having a stationary main subject portion and a flowing background portion without accurately panning a camera to follow a moving main subject. An example of such technique is disclosed in JP-A-2006-339903.

In the technique described in the publication, JP-A-2006-339903, when taking a panning shot, consecutive shooting is performed in response to a command to shoot an image. Then, a plurality of images taken by the consecutive shooting are combined while the images are positioned so that main subject portions overlap on ore another at the same position. In combining the images, first, the plural images are compared with one another and plural consecutive regions which are larger than a given size and in each of which pixel, values and their arrangement patterns are substantially the same are extracted from the entire image. Then, motion vectors are acquired for the respective extracted regions and regions having different motion vectors are recognized as different subject regions. Then, one of the recognized subject regions is employed as a region corresponding to a main subject, and the images are combined with this region used as a reference region in such a manner that main subject portions overlap on one another at the same position.

However, in the above technique, in combining plural images, in order to determine a reference region that is required for positioning the plural images, processing of comparing the plural images and extracting, from the entire image, consecutive regions which are larger than the given size and in each of which pixel values and their arrangement patterns are substantially the same is required. Accordingly, the process for positioning and combining plural images requires a considerable amount of processing power and takes a considerable amount of time.

SUMMARY

According to a first aspect of the invention, there is provided an imaging apparatus including an imaging section configured to acquire a plurality of images that are consecutively taken in time series an imaging device; a reference region setting section configured to employ one of the images acquired by the imaging section as a reference image and to set a region of the reference image as reference region, the region having high-frequency components; and an image processing section configured to combine the images including the reference image by positioning the images so as to overlap subject portions in each images, the subject portions being defined in the reference region set by the reference region setting section.

According to a second aspect of the invention, there is provided a computer-readable storage medium containing a program executable by a computer system to cause the computer system to operate in accordance with a sequence of procedure, the procedure including: instructions for acquiring a plurality of images that are consecutively taken in time series; instructions for employing one of the images acquired by the imaging section as a reference image and to set a region of the reference image as reference region, the region having high-frequency components; and instructions for combining the images including the reference image by positioning the images so as to overlap subject portions in each images, the subject portions being defined in the reference region set by the reference region setting section.

According to a third aspect of the invention, there is provided an imaging apparatus including: an imaging section configured to acquired a plurality of images that are consecutively taken in time series by an imaging device; a face detecting section configured to detect a face portion including a human face in the images acquired by the imaging section; a reference region setting section configured to employ one of the images acquired by the imaging section as a reference image and to set a region of the reference image as reference region, the region corresponding to the face portion detected by the face detecting section; and an image processing section configured to combine the images including the reference image by positioning the images so as to overlap subject portions in each images, the subject portions being defined in the reference region set by the reference region setting section.

According to a fourth aspect of the invention, there is provided an imaging apparatus including: an imaging section configured to acquire a plurality of images that are consecutively taken in time series by an imaging device; a tracking section configured to track a target subject in the images acquired by the imaging section; a reference region setting section configured to employ one of the images acquired by the imaging section as a reference image and to set a region of the reference image as reference region, the region corresponding to the target subject tracked by the tracking section; and are image processing section configured to combine the images including the reference image by positioning the images so as to overlap subject portions in each images, the subject portions being defined in the reference region set by the reference region setting section.

According to a fifth aspect of the invention, there is provided an imaging apparatus including: an imaging section configured to acquire a plurality of images that are consecutively taken in time series by an imaging device; a displacement acquiring section configured to acquire displacements of subject portions between the images acquired by the imaging section, a reference region setting section configured to employ one of the images acquired by the imaging section as a reference image and to set a region of the reference image as reference region, the region corresponding to a main subject based on the displacements acquired by the displacement acquiring section; and an image processing section configured to combine the images including the reference image by positioning the images so as to overlap the subject portions in each images, the subject portions being defined in the reference region set by the reference region setting section.

BRIEF DESCRIPTION OF THE DRAWINGS

A general configuration that implements the various feature of the invention will be described with reference to the drawings. The drawings and the associated descriptions are provided to illustrate embodiments of the invention and not to limit the scope of the invention.

DETAILED DESCRIPTION

Embodiments according to the present invention will be described in detail with reference to the accompanying drawings. The scope of the claimed invention should not be limited to the examples illustrated in the drawings and those described in below.

First Embodiment

Figure 1:
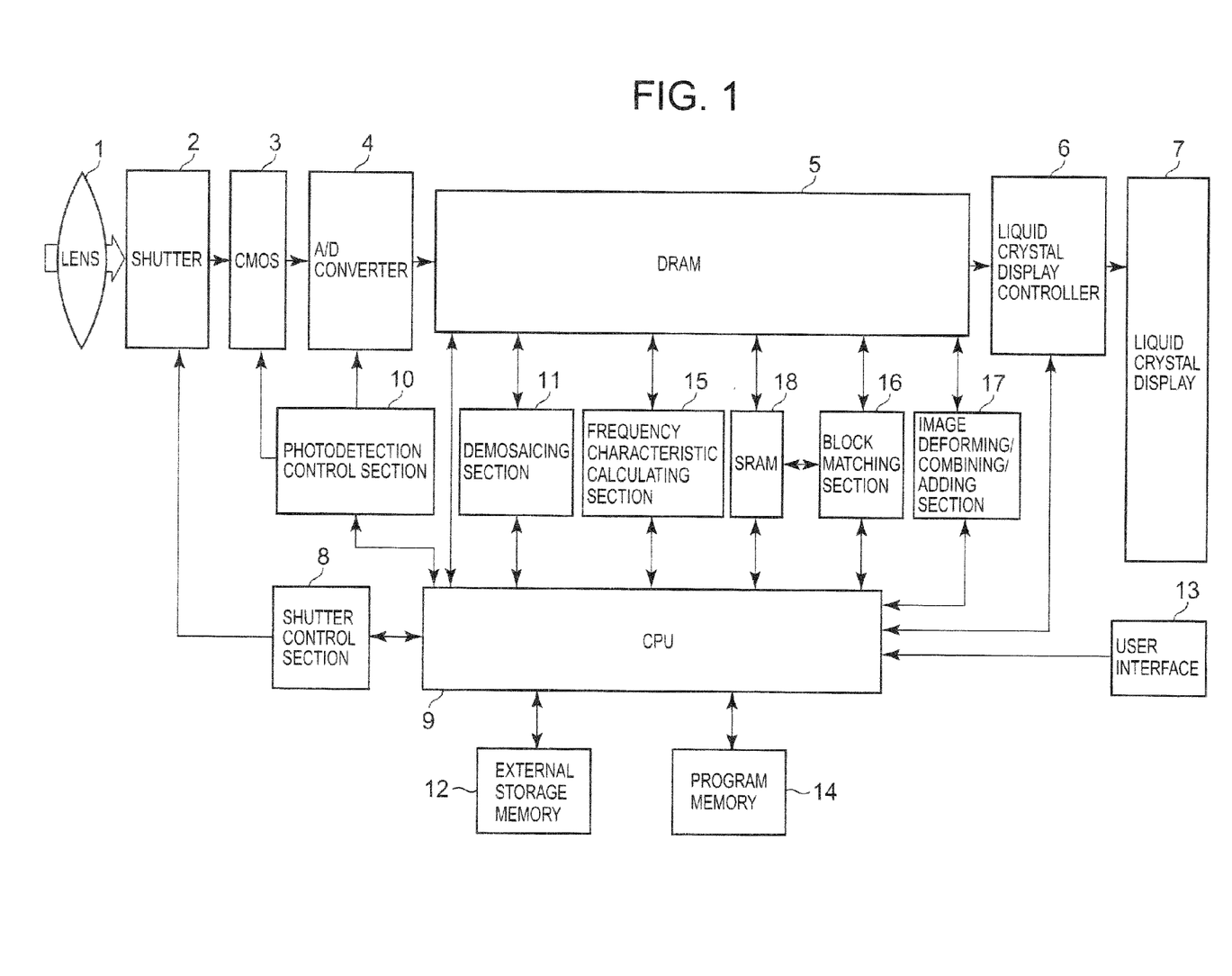
FIG. 1 is a block diagram showing an electrical configuration of a digital camera according to a first embodiment of the present invention.

FIG. 1 is a block diagram showing an electrical configuration of a digital camera according to a first embodiment of the present invention. The digital camera has a recording mode for shooting which is a basic operation mode and a reproduction mode for reproducing the images taken. The digital camera also has a panning mode as a mode subordinate to the recording mode. The panning mode is a shooting mode for taking panned images having a stationary main subject portion and a flowing background portion by performing shooting while moving the camera to follow a moving main subject.

As shown in FIG. 1, the digital camera according to the first embodiment is equipped with an imaging lens 1, a CMOS sensor 3 which is an imaging device for receiving imaging light as focused by the imaging lens 1 via a shutter 2, performing photoelectric conversion on an optical image of a subject formed on its photo detecting surface, and outputting a resulting image signal, an A/V converter 4 for converting the output signal of the CMOS sensor 3 into digital image data, and a DRAM 5 for storing the thus-produced image data successively. During shooting in the panning mode, image data of plural images are stored in the DRAM 5.

The operation of the shutter 2 is controlled by a shutter control section 8 according to an instruction output from a CPU 9. The operations of the CMOS sensor 3 and the A/D converter 4 are controlled by a photo detection control section 10 according to instructions output from the CPU 9. Image data of one image stored in the DRAM 5, that is, raw data, is converted into YUV data by a demosaic processing section 11 through pixel-by-pixel interpolation of color information. The thus-produced YUV data is displayed on a liquid crystal display 7 as a through image (also referred to as a "live view image") via a liquid crystal display controller 6.

During shooting in the panning mode, the demosaic processing section 11 converts raw data into not only YUV data (a shooting image) but also luminance image data (aluminance image) having only luminance information (when necessary). The resulting YUV data and luminance image data are stored in the DRAM 5 temporarily.

Image data that have been converted into YUV data by the demosaic processing section 11 during shooting in the recording mode are compressed by the CPU 9 according to a given compression method such as JPEG and stored in an external storage memory 12 as a still image file. In the reproduction mode, when necessary, image data stored in the external storage memory 12 as a still image file is read out and expanded by the CPU 9 and displayed on the liquid crystal display 7 via the liquid crystal display controller 6. For example, the external storage memory 12 is a memory card which can be inserted into and removed from the camera main body or a flash memory which is incorporated in the camera main body.

A user interface 13, a program memory 14, a frequency characteristic calculating section 15, a block matching section 16, and an image processing section 11 are connected to the CPU 9. The user interface 13 is provided with plural switches including a power switch, a shutter button, and a mode switching key which are used when a user operates the digital camera. The program memory 14 is a memory which is stored with various programs necessary for operation of the CPU 9 and various data that are used when those programs are run.

The CPU 9 controls operations of other sections of the digital camera in response to an operation input by the user through the user interface 13 according to the programs stored in the program memory 14, and performs the above-described compression/expansion processing on image data. In the panning mode, the CPU 9 functions as an imaging section, a reference region setting section, and a processing subject region setting section.

The frequency characteristic calculating section 15 serves as an evaluation value acquiring section which calculates frequency characteristics of specific local regions (blocks) of an image taken by the CMOS sensor 3 and outputs the calculated frequency characteristics to the CPU 9 during shooting in the panning mode.

The block matching section 16 serves as a motion vector acquiring section which performs block matching between a reference image and other images taken by the CMOS sensor 3 using an SRAM 18 as a work memory during shooting in the panning modes acquiring motion vectors each indicating a relative displacement amount and a displacement direction of a subject portion of a local region (block) of the reference image, and outputs the motion vector to the CPU 9.

The image processing section 17 positions and combines plural images taken by the CMOS sensor 3 according to are instruction from the CPU 9 during shooting in the panning mode.

Figure 2:
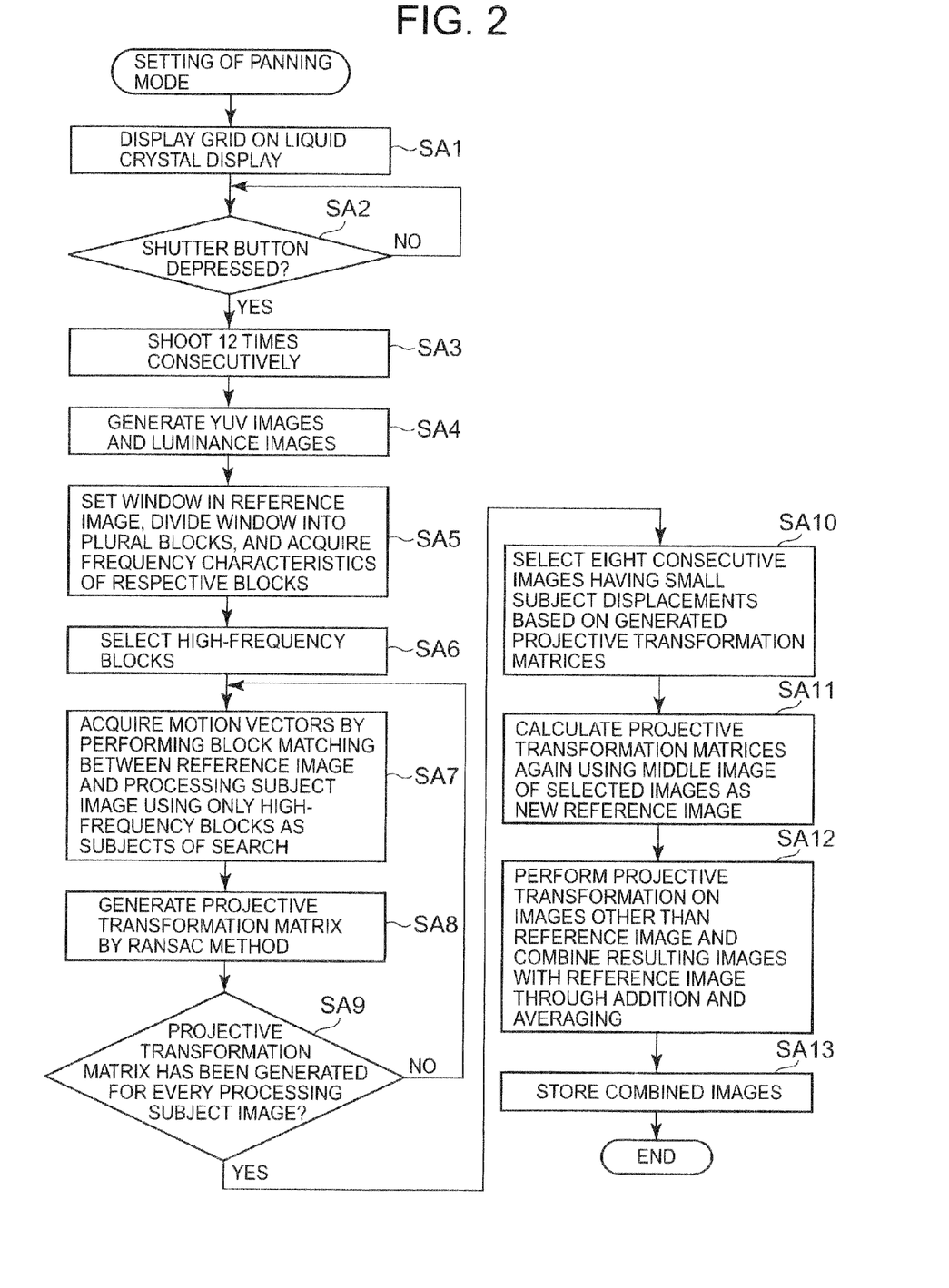
FIG. 2 is a flowchart showing a process that is performed by a CPU in a panning mode in the first embodiment.

Next, a description will be made of how the above-configured digital camera operates when the panning mode is set which is subordinate to the recording mode. FIG. 2 is a flowchart showing a process that is performed by the CPU 9 when the panning mode has been set by a user in a state that the recording mode is set.

Figure 3:
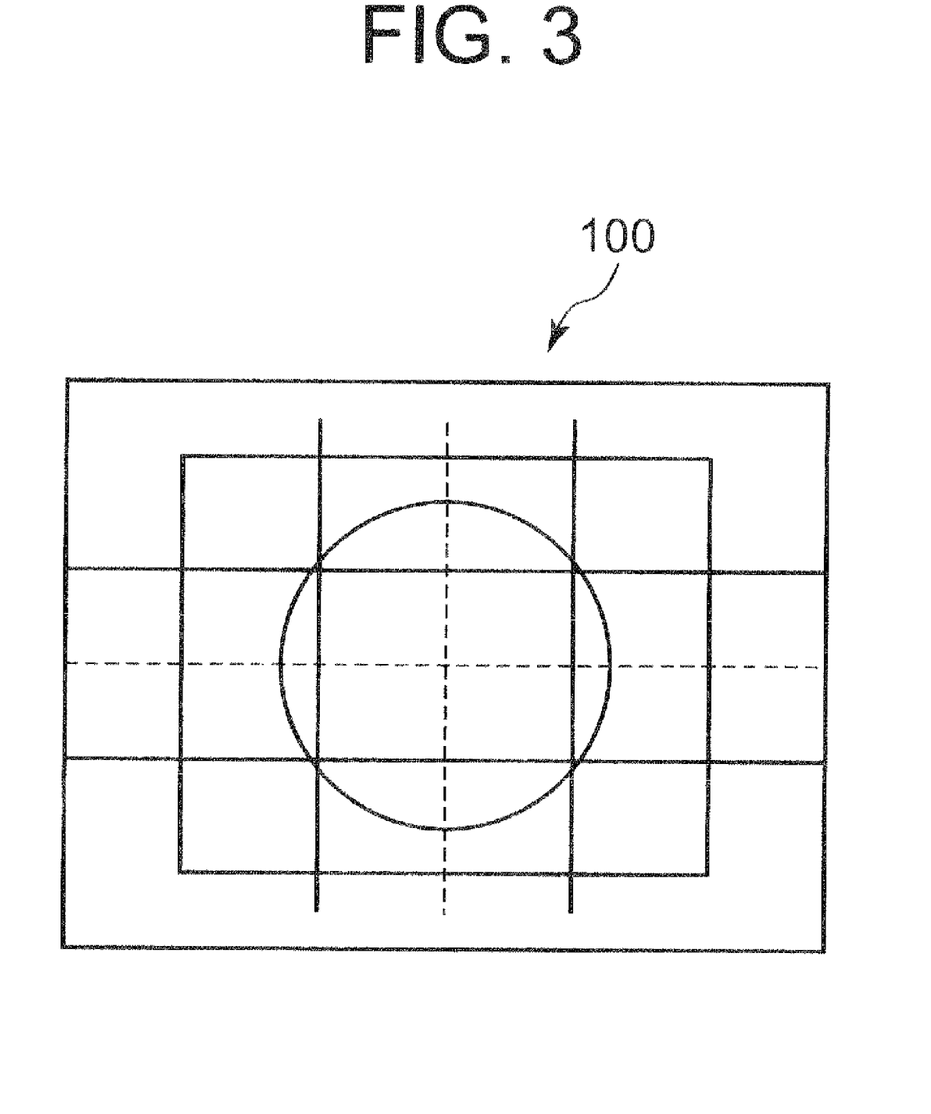
FIG. 3 shows a grid which is displayed so as to be overlapped on a through image.

Upon setting of the panning mode, at step SA1, the CPU 9 displays, on the liquid crystal display 7, a grid 100 as shown in FIG. 3 in such a manner that it is overlapped on a through image using a known OSD (on-screen display) technique. The grid 100 serves to guide a main subject so that it is located at a specific position in the frame when the user directs the camera so as to follow a movement of the main subject. In this embodiment, the specific position is the center of the frame. Therefore, to make a panning shot, the user presses the shutter button with desired shuttering timing while trying to locate a main subject at a position that is as close to the frame center as possible.

Upon press of the shutter button (SA2: yes), shooting is performed 12 times consecutively at step SA3. More specifically, at step SA3, raw data of 12 images that are consecutive in time are acquired by the CMOS sensor 3 at a consecutive shooting rate 60 fps with a shutter speed 1/60 sec in such a manner that the shooting conditions of the individual shooting attempts are set so as to attain seamless exposure. During the consecutive shooting, the camera is directed so as to follow a movement of a main subject so that the main subject is located at a position that is as close to the imaging frame center (specific position) as possible. Usually, the direction of the camera (imaging frame) is deviated from a main subject, as a result of which a main subject portion of each image has a positional displacement.

At step SA4, each row data stored in the DRAM 5 is converted into YUV data and luminance image data having only a luminance component by the demosaic processing section 11 and those image data are stored in the DRAM 5. The YUV data is image data to be subjected to combining. The luminance image data is compressed image data whose size is large enough for positioning that is to be performed later in combining plural images (YUV data).

At step SA5, the first one of the converted luminance images is employed as a reference image and a window having a given size is set in the reference image at the center. The window is divided into plural blocks each consisting of 16×16 pixels (vertical/horizontal) and frequency characteristics of the respective blocks are calculated by the frequency characteristic calculating section 15.

Figure 4A:
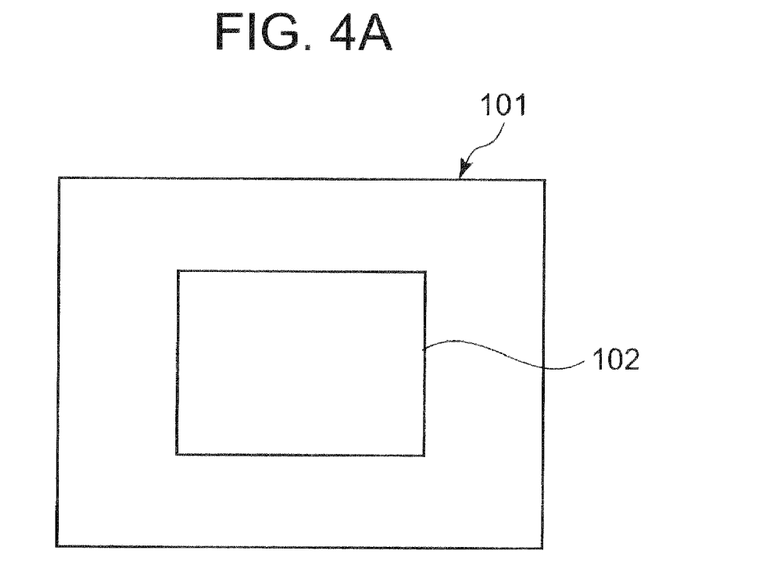
FIG. 4A shows an example of a window that is set in a reference image.
Figure 4B:
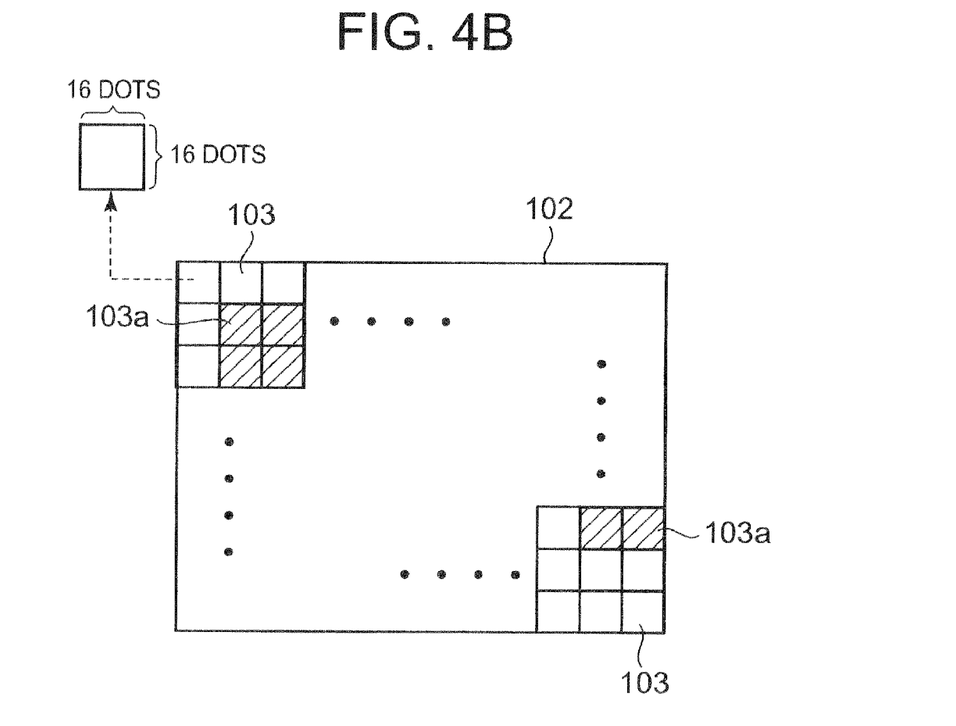
FIG. 4B shows blocks obtained by dividing the window.

FIG. 4A shows a window 102 that is set in a reference image 101 and FIG. 4B shows the window 102 and blocks 103. The window 102 is a processing subject region of the invention. In the embodiment, as shown in FIG. 4A, the window 102 is a rectangular region that is ½ of the reference image 101 in each of the vertical and horizontal lengths.

The frequency characteristic calculating section 15 calculates, as a frequency characteristic, a value of a given evaluation parameter which has a larger value when the spatial frequency of the block image is higher, that is, the block image is lower in the degree of defocusing or blurring due to a subject movement (i.e., as the block image is clearer). In the embodiment, a value of Harris corner detection evaluation parameter is calculated.

At step SA6, the CPU 9 selects high-frequency blocks based on the valuation values calculated for the respective blocks. In this processing, the blocks 103 are ranked in descending order of the evaluation value and one or plural blocks 103 whose evaluation values are larger than or equal to a given value among blocks 103 whose ranks are higher than or equal to a predetermined rank are determined regions with strong high-frequency components and selected as high-frequency blocks. Example high-frequency blocks 103a thus selected are hatched in FIG. 4B, and these high-frequency blocks constitute a reference region of the invention.

The criterion for the selection of high-frequency blocks is arbitrary. For example, all blocks 103 whose evaluation values are larger than or equal to a given value (given threshold value) or all blocks 103 whose ranks of evaluation values are higher than or equal to a given rank may be selected as high-frequency blocks. In another example, the blocks 103 are 20t ranked in ascending order of the evaluation value and blocks 103 whose evaluation values are larger than or equal to a given value among blocks 103 excluding blocks 103 whose ranks are higher than or equal to a predetermined rank are selected as high-frequency blocks. In a further example, the blocks 103 are ranked in ascending order of the evaluation value and all blocks 103 excluding blocks 103 whose ranks are higher than or equal to a predetermined rank are selected as high-frequency blocks.

At step SA7, the block matching section 16 employs, as a processing subject image, one of the above-mentioned converted images other than the reference image (the second image is employed at the beginning) and performs block matching between the reference image and the processing subject image using only subject portions of the high-frequency blocks 103a as subjects of search, whereby motion vectors are acquired which indicate the displacement amount and the directions of relative displacements between the subject portions of the two images. More specifically, in the embodiment, a subject portion is searched for in a given search range around the same coordinate block of the processing subject image and the sum of squared differences is calculated for each pair of coordinates. A motion vector of each high-frequency block is determined from a position having a smallest sum of squared differences.

In the above block matching, a subject portion of each high-frequency block 103a is searched for in the processing subject image by setting the search range to a range that is wider than an assumed search range corresponding to a predetermined allowable displacement for a subject portion, that is, a predetermined allowable displacement (number of pixels) for a main subject (e.g., a range corresponding to two times the allowable displacement). This makes it possible to detect motion vectors of a background subject portion and to acquire more correct motion vectors by eliminating blocks with which no correct motion vectors between a main subject portion and a background subject port ion can be determined.

This is because if the search range to be employed in searching for a subject portion of each high-frequency block 103a is set the same as an assumed search range corresponding to an allowable displacement of a main subject, among motion vectors acquired by block matching motion vectors of a main subject portion cannot be discriminated from those of a background subject portion and those of search failure. The specific method for calculating motion vectors by block matching is arbitrary.

At step SA8, the CPU 9 calculates a projective transformation matrix representing positional relationships of individual portions of subjects in the processing subject image with respect to those of subjects in the reference image using specific motion vectors indicating displacements of a given length or less among the motion vectors of the high-frequency blocks that were acquired by the block matching. That is, a projective transformation matrix is calculated based on only correct motion vectors excluding motion vectors that should not be obtained (i.e., motion vectors that wound be clearly wrong if acquired). In the embodiment, a projective transformation matrix is calculated by a RANSAC method to eliminate outliers (i.e., irregular motion vectors due to a subject movement). More specifically, if the projective transformation matrix support ratio (the ratio of the number of inliers (i.e., samples that make the transformation matrix effective) to the number of all samples) calculated by the RANSAC method is larger than or equal to a given value, the generation of a projective transformation matrix by the RANSAC method is regarded as successful and the projective transformation matrix is determined effective.

Steps SA7 and SA8 are performed repeatedly as the processing subject image (luminance image data) is switched in order (step SA9: no). During that course, in the block matching at step SA7, motion vectors are acquired efficiently by shifting the center of the above-mentioned search range by a length corresponding to an average motion vector of the immediately preceding processing subject image (the second image if the current processing subject image is the third image).

If a projective transformation matrix has been acquired for every processing subject image (luminance image data), that is, if positional relationships between main subject portions (portions considered to be so) in all the images have been recognized (step SA9: yes), at step SA10 translation components between adjacent frames are calculated from the projective transformation matrices acquired at step SA8 and eight consecutive images in which the displacement of the main subject is determined small are selected according to a giver selection criterion that is based on the calculated translation components. Such eight images are selected in such a manner that the displacement amount of translation component vectors of the respective images are accumulated for each set of eight adjacent images and a set of images having a smallest accumulation value is selected. If there are plural sets of images having the same accumulation value (or the differences between accumulation values are within a given value), a set of images that are closest to the shutter press time is selected.

At step SA11, the luminance image of a middle image (the fourth image in the order of shooting) of the thus-selected set of adjacent images is set as a new reference image. Motion vectors are acquired for each of the other images (luminance image data) and projective transformation matrices are calculated again by performing the same processing as steps SA5-SA9. In calculating a projective transformation matrix again, motion vectors between the new reference image and each of the other images may be acquired through conversion from the already acquired motion vectors without performing steps SA5-SA7 again to lower the processing load for acquiring new motion vectors. However, in this case, it is unavoidable that the accuracy of motion vectors is lowered.

At step SA12, the image processing section 17 performs projective transformation on the YUV data of the images (frames) other than the reference image using the calculated projective transformation matrices and combines resulting images with the reference image (YUV data) through addition and averaging. At step SA13, combined images are stored in the external storage memory 12 as captured images. Panned images are thus obtained.

As described above, in the embodiment, plural images (YUV data) acquired by consecutive shooting in the panning mode are positioned and combined in the following manner. One or plural high-frequency blocks 103a (see FIG. 4B) having higher spatial frequencies than the other blocks are selected from plural blocks 103 obtained by dividing a window 102 of a given reference image 101 (luminance image data). Motion vectors of the selected high-frequency blocks 103a are acquired and the plural images are positioned based on only the acquired motion vectors of the high-frequency blocks 103a.

That is, a region of the reference image 101 (window 102) that would correspond to a main subject is determined based on frequency characteristics of individual blocks. Therefore, the processing for determining a region corresponding to a main subject is simpler than in the conventional case, whereby the processing of combining plural images in generating panned images can be performed efficiently and quickly.

Motion vectors are acquired for only high-frequency blocks 103a that are determined as having strong high-frequency components based on their frequency characteristics. In combining plural images, they are positioned based on only the motion vectors of the high-frequency blocks. Therefore, the number of motion vectors that are necessary for positioning of plural images (YUV data) acquired by consecutive shooting can be minimized and the plural images can be combined efficiently and quickly in generating panned images.

If it is intended to merely simplify the processing for determining a region corresponding to a main subject, instead of motion vectors of only high-frequency blocks 103a (embodiment), motion vectors of all blocks 103 in a rectangular region that circumscribes one or plural high-frequency blocks 103a may be employed as motion vectors that are used for positioning the plural images.

A window 102 (processing subject region) is set in a reference image 101 (luminance image data) and high-frequency blocks 103a are selected in the window 102. This makes it possible to reduce the load of selecting high-frequency blocks 103a, that is, determining a region corresponding to a main subject, and to thereby perform, even more efficiently and quickly, the processing of combining plural images in generating panned images.

Although in the embodiment a window 102 is set in a reference image 101, the invention is not limited to such a case. A modification is possible in which the entire reference image 101 is divided into blocks, high-frequency blocks are selected from the entire reference image 101, and images are positioned based on motion vectors of those high-frequency blocks. Even in this case, the processing for determining a region corresponding to a main subject is simpler than in the conventional case and the processing of combining plural images in generating panned images can be performed efficiently and quickly.

In the first embodiment, the setting position of the window 102 in the reference image 101 is fixed (at the center). However, the window 102 need not always be set at the center. A configuration is possible in which the user can select a position of the window 102 in advance or may freely set the position of the window 102; the position of the window 102 is thus selected or set arbitrarily. Furthermore, although in the embodiment the size of the window 102 is fixed, a configuration is possible in which the size of the window 102 can be changed.

The window 102 may be overlapped on a through image (consecutively captured images). This allows the user to locate a main subject within the window 102.

In the block matching of step SA7 according to the first embodiment, as described above, a subject portion of each high-frequency block 103a is searched for by setting the search range to a range that is wider than an assumed search range corresponding to an allowable displacement for a main subject so that a correct motion vector is acquired for the high-frequency block 103a. This makes it possible to position plural images (YUV data) more correctly based on motion vectors of the high-frequency blocks and to thereby obtain high-quality panned images as captured images.

In the first embodiment, plural images are positioned and combined in such a manner that images (YUV data) other than a reference image are combined with the reference image after being deformed according to projective transformation on matrices which are calculated based on motion vectors of high-frequency blocks 103a. As a result, high sameness can be secured for main subject portions even if the shooting angle or the shooting distance of the main subject varies from one image to another. This makes it possible to obtain high-quality panned images as captured images.

In the first embodiment, as described above, the projective transformation matrix is calculated in step SA8 based on only correct motion vectors excluding motion vectors that should not be obtained (i.e., motion vectors that wound be clearly wrong if acquired). This makes it possible to correctly position plural images (YUV data) through the projective transformation and, at the same time, to reliably secure high sameness for subject portions of the individual images. This feature also contributes to obtaining high-quality panned images as captured images.

When plural images (YUV data) are positioned and combined, images other than the reference image 101 may not always be subjected to projective transformation. For example, the following procedure may be possible. After high-frequency blocks 103a are selected in the window 102 of the reference image 101 at step SA6 of the flowchart of FIG. 2, motion vectors are acquired for the high-frequency blocks 103a between the reference image 101 and each of the other images. The plural images (YUV data) are positioned and combined according to the thus-acquired motion vectors.

Even in this case high-quality panned images can be obtained as captured images by positioning the plural images (YUV data) based on only correct motion vectors by employing specific motion vectors indicating displacements of a given distance or less as motion vectors to be used for positioning the plural images (YUV data) and thereby eliminating motion vectors that should not be obtained (i.e., motion vectors having apparent error).

Eight consecutive images in which main subject portions have only small displacements are selected automatically from 12 consecutively captured images according to a predetermined selection criterion and only the thus-selected images are combined. This makes it possible to prevent image quality reduction of a main subject portion and a background portion of each image due to a camera shake during consecutive shooting. This feature also contributes to obtaining high-quality panned images as captured images.

In the embodiment, in the panning mode, consecutive shooting is performed in response to a shooting command that is given by depressing the shutter button, a predetermined number of (eight) images are selected from plural (12) images acquired by the consecutive shooting, and the thus-selected images are combined. Alternatively, for example, panned images may be obtained by combining all images acquired by consecutive shooting. That is, the following procedure is possible. Referring to the flowchart of FIG. 2, after projective transformation matrices have been acquired for all processing subject images (luminance image data) other than the reference image 101 by steps SA7-SA9 (SA9: yes), the process directly moves to step SA12, where the YUV data of the images other than the reference image are subjected to projective transformation according to the projective transformation matrices acquired by steps SA7 and SA8 and resulting images are combined with the reference image (YUV data) through addition.

In each of the case of combining all images acquired by consecutive shooting and the case of combining a predetermined number of images selected from images acquired by consecutive shooting (as in the embodiment), the image to be used as a reference in combining (i.e., the image whose luminance image is used as the reference image 101 in acquiring motion vectors) is not limited to an image that was taken with timing that is closest to the start of the consecutive shooting and may be, for example, an image whose shooting time is located at the center among plural images to be combined.

The number of images to be combined may be made variable. For example, a configuration is possible in which the degree of flowing of a background portion of panned images can be set stepwise; the user is caused to select the degree of flowing of a background portion prior to shooting in the panning mode and a number, corresponding to the selected degree of flowing, of images are combined finally. As a further alternative, the number of images to be combined may be changed automatically according to the brightness of a subject at the time of shooting. For example, the number of images to be combined may be increased automatically to a predetermined number that corresponds to the brightness of a subject or decreased according to the brightness of a subject on condition that the brightness of the subject is lower than or equal to a threshold value above which the SN ratio of captured images will become unduly small. This makes it possible to obtain high-image-quality panned images even in a dark shooting environment. In this case, reference brightness of a subject may be brightness of a subject portion in the entire angle of view or brightness of a subject portion in a certain region such as the window 102 (see FIGS. 4A and 4B).

In the panning mode, the following procedure is possible. Consecutive shooting is started before a shooting command is given and a given number of (e.g., 12) images acquired latest are stored and held. After the shooting, the above-described step SA4 and following steps are performed for all available images acquired before and after the time of a shooting command (e.g., the 12 images acquired before the time of the shooting command and 12 images acquired after that (24 images in total). In this case, if an image acquired after the time of the shooting command (e.g., immediately after that) is used as a reference image 101 at step SA5, panned images can be obtained in which importance is attached to the state of a main subject at shooting timing which is desired by the user.

Although in the embodiment a grid 100 (see FIG. 3) is overlapped on a through image that is displayed in the panning mode, instead of the grid 100 the following image may be displayed on a through image in the following manner during consecutive shooting. Steps SA5 and SA6 in the flowchart of FIG. 2 are performed every time a new image is acquired during consecutive shooting. An image of a reference region consisting of high-frequency blocks 103a that have been selected from an image that was acquired immediately before or a specific region including all blocks 103 in a rectangular region that circumscribes one or plural high-frequency blocks 103a that have been selected from an image that was acquired immediately before is overlapped, in the form of a semitransparent image obtained by pixel decimation or the like, on a through image. Or a rectangular frame indicating such a specific region is overlapped on a through image. That is, a through image may be displayed in such a manner that a region that highly likely includes a main subject region can be discriminated from other ordinary regions. An alternative procedure is as follows. Steps SA5 and SA6 in the flowchart of FIG. 2 are performed on a first image immediately after it is acquired during consecutive shooting. An image of a reference region consisting of high-frequency blocks 103a that have been selected from the first image or a specific region including all blocks 103 in a rectangular region that circumscribes one or plural high-frequency blocks 103a that have been selected from the first image is overlapped, in the form of a semitransparent image obtained by pixel decimation or the like, on the second and following images (through image). Or a rectangular frame indicating such a specific region is overlapped on the second and following images.

In the above cases, during consecutive shooting (panning) the user can be informed of a more appropriate shooting position of a main subject (i.e., a position of the main subject in an angle of view), which allows the user to more easily let the camera follow a movement of the main subject properly. Naturally, this advantage becomes more remarkable as the shooting time length of the panning becomes longer.

In taking a panning shot, the camera is caused to follow a movement of a main subject from before the shutter button is depressed. Therefore, the following procedure is possible. A consecutive shooting operation is performed irrespective of whether resulting images are used for generating (combining) panned images (it is performed even in a shooting standby state). An image of a reference region or a specific region as mentioned above of an image that was taken immediately before is overlapped, in the form of a semitransparent image, on a shooting-standby through image. Or a rectangular frame indicating such a specific region is overlapped on a shooting-standby through image. An alternative procedure is as follows. Steps SA5 and SA6 in the flowchart of FIG. 2 are performed on a through image acquired in a shooting-standby state. An image of a reference region or a specific region as mentioned above in the through image that was acquired in the shooting-standby state is overlapped on consecutively captured images (through images) acquired after press of the shutter button. Or a rectangular frame indicating such a specific region is overlapped on such consecutively captured images.

In a case where the digital camera is provided with a face detecting function for detecting a face portion of a person in an image, a region corresponding to a face portion that was detected, for example, immediately before shooting start timing may be employed as the window 102 (processing subject region) which is set in the reference image 101. Where the invention is applied to a digital camera or the like having an automatic subject-of-attention tracking function for continuously detecting, in images taken successively, an arbitrary subject portion specified in advance while a through image is displayed or the shutter button is half depressed, a region corresponding to a subject portion that was detected at shooting start timing may be employed as the window 102 (processing subject region) which is set in the reference image 101.

In the case where the digital camera is provided with the face detecting function or the automatic subject-of-attention tracking function, the following procedure may be applied. For example, steps SA5 and SA6 in the flowchart of FIG. 2 are replaced by a step of detecting a face region in each of consecutively captured images using the face detecting function. At, steps SA7 and SA11, motion vectors between the face region in a reference image and that of each of processing subject images are acquired. An alternative procedure is as follows. Steps SA5 and SA6 in the flowchart of FIG. 2 are replaced by a step of detecting a face region in a reference image using the face detecting function. At steps SA7 and SA11, motion vectors are acquired by performing block matching on each of processing subject images other than the reference image using the face region in the reference image as subject to be tracked.

Motion vectors may be acquired by performing block matching on each of processing subject images other than a reference image using, as a reference region (subject of tracking) of the reference image, a region corresponding to a subject portion that was already detected (tracked) at start timing of consecutive shooting or a region corresponding to a given portion (e.g., a center portion in an angle of view) in the reference image.

That is, a region corresponding to a face portion detected by the face detecting function, a subject portion that was detected (tracked) at start timing of consecutive shooting, or a region corresponding to a given portion (e.g., a center portion in an angle of view) in a reference image may be determined, as it is, a region corresponding to a main subject. Even in this case, the processing for determining a region corresponding to a main subject is simper than in the conventional case and hence the processing of combining plural images in generating panned images can be performed efficiently and quickly.

Second Embodiment

Next, a second embodiment of the invention will be described. The second embodiment relates to a digital camera having a panning mode as a mode subordinate to a recording mode. In the digital camera according to the second embodiment, the frequency characteristic calculating section 15 shown in FIG. 1 is omitted and a program for causing the CPU 9 to execute the following process in shooting in the panning mode is stored in the program memory 14.

Figure 5:
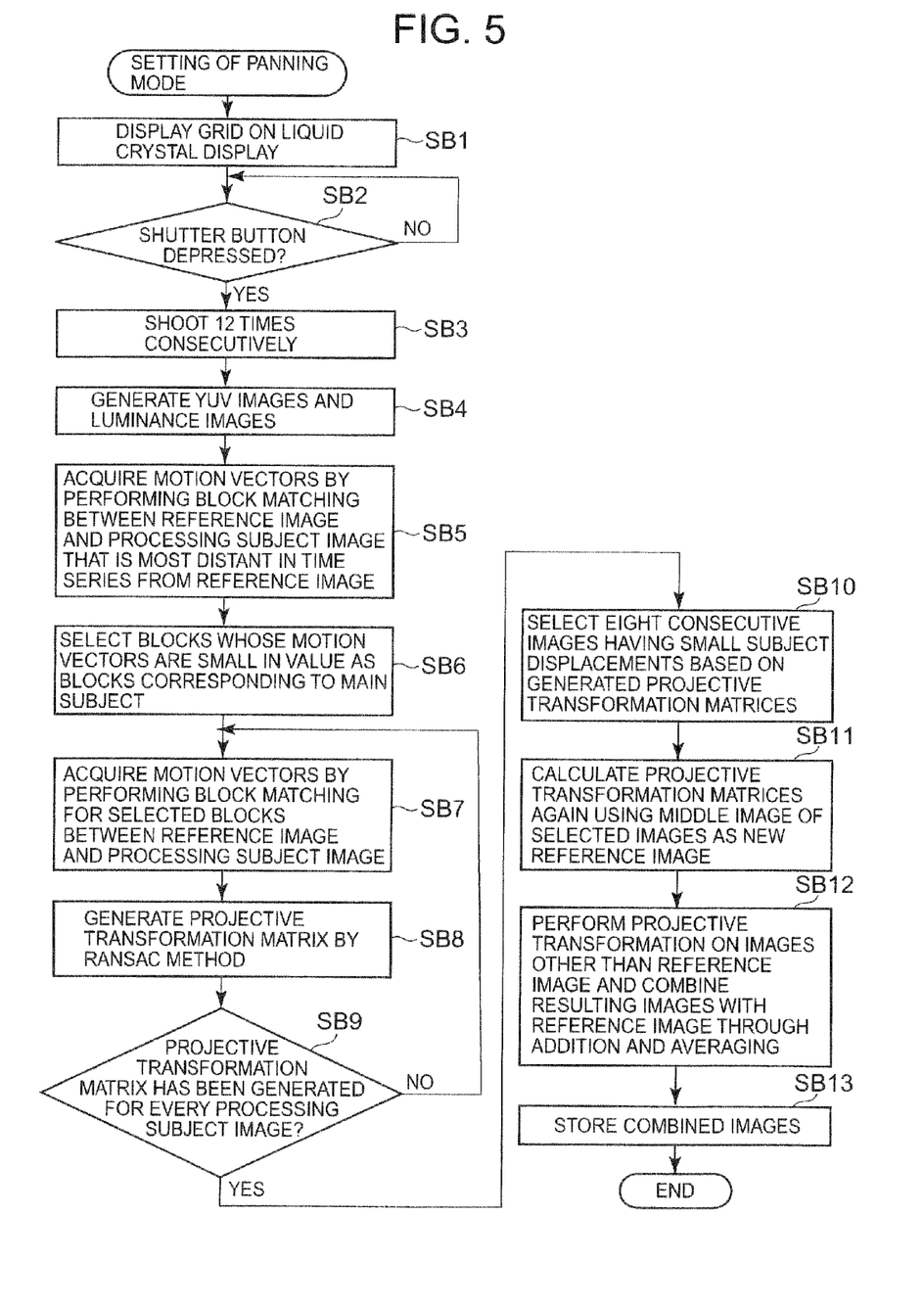
FIG. 5 is a flowchart showing a process that is performed by a CPU in a panning mode in a second embodiment.

The operation of the digital camera according to the second embodiment of the invention will be described below. FIG. 5 is a flowchart showing a process that is performed by the CPU 9 when the panning mode has been set by a user.

Steps SB1-SB4 are the same as the above-described steps SA1-SA4. Also in the second embodiment, upon setting of the panning mode, the CPU 9 displays a grid 100 in such a manner that it is overlapped on a through image. Upon press of the shutter button, shooting is performed 12 times consecutively and YUV data and luminance image data are generated and stored for each of 12 images acquired.

In the second embodiment, at step SB5, the first one of the 12 luminance images is employed as a reference image and a window 102 is set in the reference image at the center. The window 102 is divided into plural blocks 103 and motion vectors are acquired for the respective blocks 103 between the reference image and the 12th image (luminance image data) that is most distant in time from the reference image. The sizes (and the positions) of the window 102 and each block 103 and the specific method for acquiring motion vectors are the same as in the first embodiment.

Figure 6A:
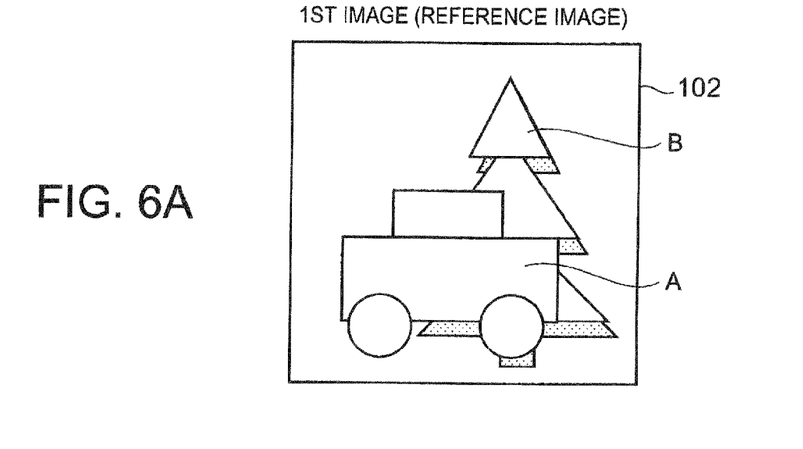
FIGS. 6A-6C show an example of differences in the relationship between a main subject and a background subject.
Figure 6B:
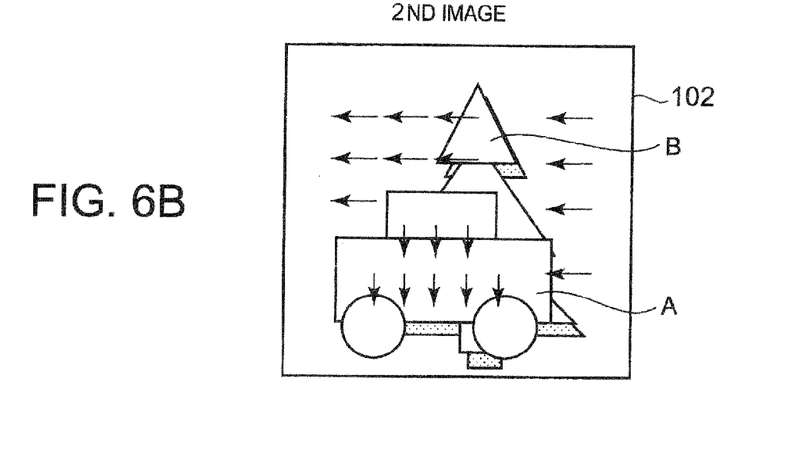
Figure 6C:
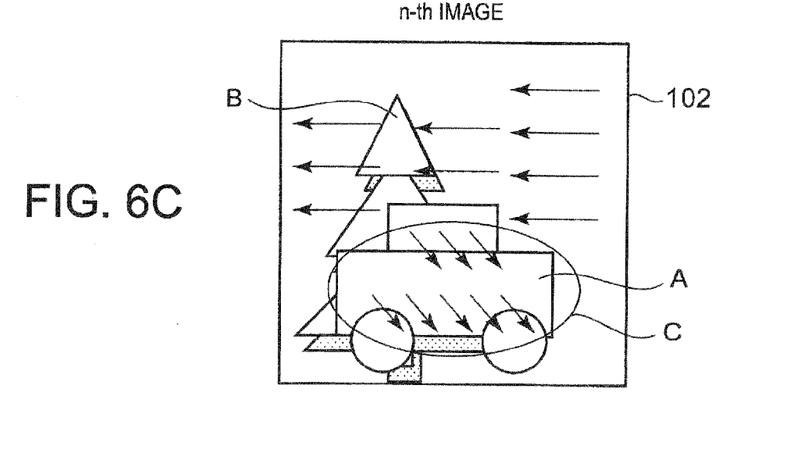

The reason for employing the 12th image as a subject of block matching is as follows. FIGS. 6A-6C show differences in the positional relationship between a main subject A and a background subject B in the window 102 between first, second, and n-th (n: 3 or larger) images. Arrows shown in FIGS. 6B and 6C represent motion vectors of portions (only selected portions) of the images in a case that the motion vectors are obtained for the second and n-th images (processing subject images) with respect to the first image (reference image). The length of each arrow represents the value of the motion vector. As seen from FIGS. 6B and 6C, as the time interval between the processing subject image and the reference image increases, the value of each motion vector of the background portion with respect to the main subject portion becomes larger, that is, the motion vectors separate the main subject portion and the background portion more clearly.

At step SB6, the CPU 9 selects, as a block(s) corresponding to a main subject, one or plural specific blocks the values of whose motion vectors are smaller than or equal to a given length (i.e., the displacements of a subject portion corresponding to those blocks are smaller than or equal to a threshold value) among the blocks acquired between the reference image and the 12th image by the block matching. The thus-selected one or plural specific blocks (hereinafter referred to as "selected blocks") constitute a reference region of the invention. For example, blocks that are located in the region indicated by an elliptical circle C in FIG. 6C and are adjacent to or separated from each other are selected blocks.

At steps SB7-SB9, the CPU 9 employs all images (luminance image data) other than the reference image as processing subject images and calculates a projective transformation matrix representing positional relationships of subject portions of each processing subject image with respect to those of the reference image using the motion vector data of the selected blocks. The following steps are the same as in the first embodiment. At steps SB10-SB13, eight consecutive images (YUV data) are selected based on the calculated projective transformation matrices, a new reference image is determined from the eight images and projective transformation matrices are calculated again, the images (YUV data) other than the reference image are deformed based on the calculated projective transformation matrices, and deformed images are combined and combined images are stored as captured images.

As described above, in the embodiment, a region in a reference image (in a window) that would correspond to a main subject is determined based on the values of motion vectors acquired between the reference image and an image that is most distant in time from the reference image. Therefore, as in the first embodiment, the processing for determining a region corresponding to a main subject is simpler than in the conventional case and the processing of combining plural images in generating panned images can be performed efficiently and quickly.

Furthermore, in combining plural images, the plural images are positioned based on only the motion vectors of specific blocks the values whose motion vectors are smaller than or equal to a given length. As a result, the number of motion vectors that are necessary for positioning plural images can be minimized and hence the processing of combining plural images in generating panned images can be performed efficiently and quickly.

In the second embodiment, a window that is set in a reference image is divided into plural blocks and one or plural specific blocks are selected from those blocks. However, one or plural specific blocks may be selected from plural blocks having a constant size obtained by dividing the entire reference image. Even in this case, the processing of determining a region corresponding to a main subject is simple and the processing of combining plural images in generating panned images can be performed efficiently and quickly.

For example, in a configuration that is provided with a face detecting function or the like, a window (processing subject region) which is set in a reference image may be a region corresponding to a face portion that was detected, for example, immediately before shooting timing. In a configuration that is provided with an automatic tracking function, it may be a region corresponding to a target subject that was detected at shooting start timing.

Next, a modification of the second embodiment in which, as in the second embodiment, a region (specific blocks) in a reference image that would corresponding to a main subject is determined based on the values of motion vectors acquired between the reference image and an image that is most distant in time from the reference image.

When assumed that a background subjects are unmoved during consecutive shooting, the values of motion vectors of a region (blocks) corresponding to the background subject should be approximately equal to the distance of an angle-of-view movement (i.e., an overall displacement of subjects in the frame) caused by a camera movement from a shooting time of a reference image (first image) to a shooting time of an image that is most distant in time from the reference image. Therefore, a region with which motion vectors whose displacement is different from the distance of an angle-of-view movement caused by a camera movement from a shooting time of a reference image to a shooting time of an image that is most distant run time from the reference image may be determined a region corresponding to a main subject.

Figure 7:
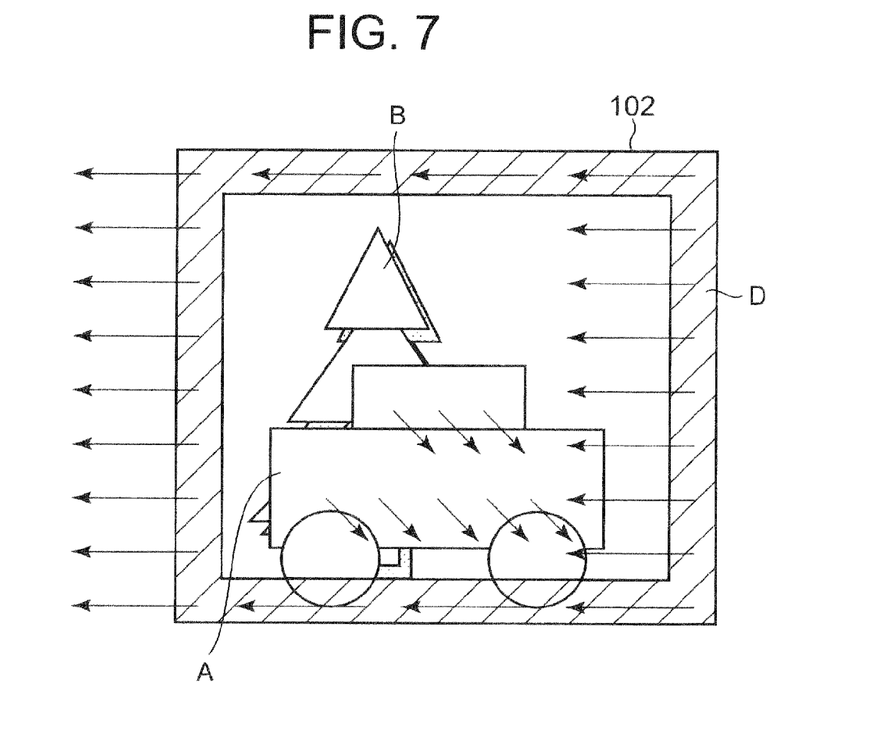
FIG. 7 shows an example of differences between motion vectors of a subject portion in a perimeter region set in a window and those of other subject portions.

More specifically, for example, a perimeter region D having a given width (see FIG. 7) is set in a window 102 of a reference image (or in the entire reference image) Step SB6 in FIG. 5 is replaced by the following step. First, an average (motion vector value) of displacements (movement distances) of subject portions of the respective blocks indicated by motion vectors of all blocks in the perimeter region D of the reference image is calculated as angle-of-view movement information indicating a distance of an angle-of-view movement caused by a camera movement. Among blocks outside the perimeter region D of the reference image, such blocks that differences between their displacements (motion vector values) and the calculated average are within a given range are employed as blocks corresponding to a background subject B. Blocks excluding these blocks are selected as blocks corresponding to a main subject A. For example, the above-mentioned displacement (movement distance) may be a displacement only in a specific direction such as the horizontal direction. In selecting blocks corresponding to the main subject A based on the average, such blocks that differences between the displacements of their subject portions and the calculated average are out of the given range may directly be determined (and selected as) blocks corresponding to the main subject A.

Another modification is as follows. In a digital camera having a given movement distance detecting section such as gyro sensors which detect movement distances of the main body in the top-bottom director and/or the right-left direction, a movement distance of the main body from a shooting start time to a shooting end time are acquired when consecutive shooting is performed at step SB3. Step SB6 is replaced by the following step. The movement distance of the main body is converted into a displacement of a subject in images according to the focal length of the imaging lens 1. This is angle-of-view movement information representing the distance of an angle-of-view movement that is associated with the camera movement. Among the blocks in the window 102 of a reference image (or in the entire reference image), such blocks that differences between their displacements (motion vector values) and the converted displacement are within a given range are employed as blocks corresponding to a background subject B. Blocks excluding these blocks are selected as blocks corresponding to a main subject A. The above-sustained displacement (movement distance) may be a displacement only in a specific director such as the horizontal direction. Also, where blocks corresponding to the main subject A are selected based on the displacement (converted displacement) of a subject obtained by converting the movement distance of the main body, subject blocks that differences between the displacements of their subject portions and the converted displacement are out of a given range may directly be determined (and selected as) blocks corresponding to the main subject A.

Even where, as described above, a region with which motion vectors whose displacements are different from the distance of an angle-of-view movement associated with a camera movement are acquired is determined blocks corresponding to a main subject, the processing for determining a region corresponding to a main subject is simple. Therefore, the processing of combining plural images in generating panned images can be performed efficiently and quickly.

Instead of determining blocks corresponding to a main subject using, as a reference, the distance of an angle-of-view movement associated with a camera movement, such blocks may be determined in, for example, the following manner based on motion vectors that are acquired between a reference image (luminance image data) and an image (luminance image data) that is most distant in time from the reference image.

The values of motion vectors of all blocks acquired between a reference image (luminance image data) and an image (luminance image data) that is most distant in time from the reference image approximate those of blocks corresponding to a main subject as well as those of blocks corresponding to a background subject. At the same time, the motion vector values are polarized to those of the one kind of blocks and those of the other kind of blocks. That is, the motion vector values of all blocks are always localized.

Figure 8:
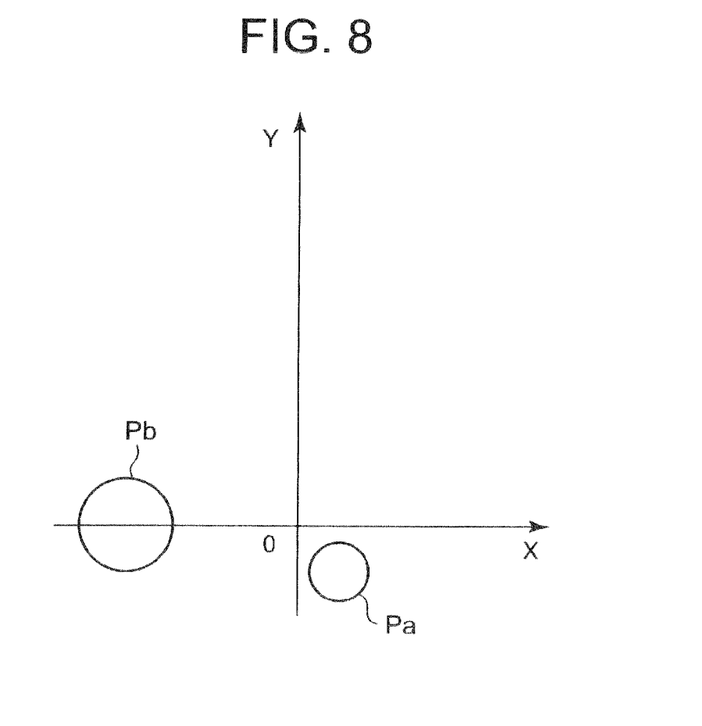
FIG. 8 shows an example of localization of motion vectors of blocks in a window.

FIG. 8 shows an example of such localization. FIG. 8 is a distribution diagram in which points each representing a displacement in the X direction and a displacement in the Y direction that are indicated by a motion vector of each block are plotted on the orthogonal coordinate plane that is defined by the X axis and the Y axis. For example, a point representing a displacement n in the X direction and a displacement m in the Y direction are plotted at a position (n, m). FIG. 8 corresponds to a case that a main subject moves slightly down rightward and a background subject moves leftward in the frame (angle of view) during consecutive shooting. In this case, points of blocks corresponding to the main subject form a first distribution region Pa that is located in the fourth quadrant and is close to the origin O (i.e., the displacements are small) and points of blocks corresponding to the background subject form a second distribution region Pb that bridges the second and third quadrants and is far from the origin O (i.e., the displacements are large).

Therefore, an appropriate procedure is to check which of the first distribution region Pa or the second distribution region Pb the motion vector of each block belongs to and determines that each block whose motion vector belongs to the first distribution region Pa corresponds to the main subject. Blocks corresponding to the main subject may be determined based on a distribution of only the displacement amount of displacements of subject portions indicated by motion vectors (their directions are disregarded). Based on the above discussion, a specific procedure may be as follows. For example, at step SB6 in FIG. 5, frequencies of respective displacement intervals (in one or both of the X direction and the Y direction) are accumulated from motion vectors of all blocks. In a resulting histogram, a first distribution region having small displacements and a second distribution region having large displacements are determined by given processing including statistical calculations. Blocks corresponding to the first distribution region are determined (and selected as) blocks corresponding to a main subject.

Even where, as described above, blocks corresponding to a main subject are determined based on a distribution of motion vectors (displacements of subject portions) of all blocks, the processing for determining a region corresponding to a main subject is simple. Therefore, the processing of combining plural images in generating panned images can be performed efficiently and quickly.

In the above modifications, it is assumed that motion vectors based on which blocks corresponding to a main subject are determined are acquired between a first image which is employed as a reference image and an image that is most distant in time from the reference image. However, the processing subject image that is not the reference image and is used or calculating motion vectors may be an image that is not the image that is most distant in time from the reference image as long as it is distant from the reference image by a given time (a given number of images) or more. Naturally, in terms of increasing the degree of separation between motion vectors (described above), it is desirable to employ the image that is most distant in time from the reference image. The reference image need not always be the first image.

In each of the above modifications, blocks corresponding to a main subject are determined based on only motion vectors (of respective blocks) that are acquired between two images, that is, a first image which is employed as a reference image and an image that is most distant in time from the reference image. However, blocks corresponding to a main subject may be determined based on motion vectors (of respective blocks) that are acquired between each pair of images of plural images taken by consecutive shooting.

For example, the following procedure is possible. After YUV data and luminance image data have been acquired by consecutive shooting, plural sets of motion vectors are acquired for respective blocks using the luminance image data by performing block matching repeatedly while changing the pair of processing subject images. Displacements (movement distances) of subject portions indicated by the acquired sets of motion vectors are accumulated on a bock-by-block basis. Resulting accumulation values are used for determining blocks corresponding to a main subject. In each of the above modifications, such accumulation values may be used in place of displacements indicated by motion vectors of respective blocks.

An alternative procedure is as follows. Blocks that are determined as corresponding to a main subject are determined by performing the above-described processing by employing two adjacent images rather than two images that are most distant in time from each other as the images between which to acquire motion vectors (of respective blocks). Blocks that are determined as corresponding to a main subject are determined plural times (the number of all images minus one times) by using all pairs of images, that is, first and second images, second and third images, third and fourth images, and so forth. Blocks that are determined as corresponding to a main subject are determined finally based on pieces of block information that have been determined by the plural times of processing.

For example, among the blocks determined by the plural times of processing, only blocks determined by all the pieces of processing or only blocks determined by a given number or more of times may be selected as blocks corresponding to a main subject. Where the above procedure is applied to the modification in which a movement distance of the main body detected by gyro sensors or the like is used together with motion vectors in determining blocks corresponding to a main subject among the above-described modifications, it is necessary to detect a movement distance of the main body for every pair of images.

The first and second embodiments are such that the invention is applied to the digital camera using the CMOS sensor as an imaging device, the CMOS sensor may be replaced by another imaging device such as a CCD. All or a part of the functions of the demosaic processing section 11, the frequency characteristic calculating section 15, the block matching section 16, and the image processing section 17 may be realized by causing the CPU 9 to operate according to software programs. The application of the invention is not limited to digital cameras and the present invention can also be applied to other kinds of imaging apparatus having a still image shooting function such as cell phones incorporating a camera.

The application of the invention is not limited to imaging apparatus and the invention can also be applied to arbitrary image processing apparatus having a function of generating panned images from plural images that are consecutive in time. Such image processing apparatus include personal computers that realize the above functions by operating according to software programs.

It is to be understood that the present invention is not limited to the specific embodiments described above and that the invention can be embodied with the components modified without departing from the spirit and scope of the invention. The invention can be embodied in various forms according to appropriate combinations of the components disclosed in the embodiments described above. For example, some components may be deleted from all components shown in the embodiments. Further, the components in different embodiments may be used appropriately in combination.

What is claimed is:

1. An imaging apparatus comprising:
   an imaging section configured to acquire a plurality of images that are consecutively taken in time series by an imaging device;
   an evaluation value acquiring section configured to employ one of the images acquired by the imaging section as a reference image and divide the reference image into a plurality of blocks, and to acquire evaluation values indicating amounts of high-frequency components for the blocks, respectively;
   a reference region setting section configured to set a region as a reference region, the region comprising blocks selected from among the plurality of blocks based on the evaluation value for each block acquired by the evaluation value acquiring section;
   a motion vector acquiring section configured to acquire a motion vector for each of the selected blocks of the reference region of the reference image set by the reference region setting section; and
   an image processing section configured to combine images including the reference image and another image by positioning the images so as to overlap subject portions in each image based on the motion vectors acquired by the motion vector acquiring section.

2. The apparatus according to claim 1, wherein the reference region setting section sets, as the reference region, a region that includes a specific block with at least one of (i) an evaluation value that is larger than a given value and (ii) a rank that is higher than a given rank when the specific blocks are ranked by evaluation value.

3. The apparatus according to claim 1, further comprising:
   a processing subject region setting section configured to set a processing subject region in the reference image,
   wherein the reference region setting section sets, as the reference region, a region having high-frequency components in the processing subject region.

4. The apparatus according to claim 1, wherein a shooting condition of the plurality of images that are consecutively taken in time series by the imaging device is set to have a shutter speed that is substantially equal to a consecutive shooting interval.

5. The apparatus according to claim 4, wherein the image processing section comprises a projective transformation section configured to perform projective transform on the images except a given image using the given image as a reference based on the respective motion vectors of the blocks acquired by the motion vector acquiring section, and
   wherein the image processing section combines the images including the reference image by positioning the images so that subject portions in the reference region of the reference image overlap on one another by combining, with the given image, the images except the given image as subjected to the projective transformation by the projective transformation section.

6. The apparatus according to claim 1, wherein the motion vector acquiring section acquires the respective motion vectors of the blocks included in the reference region by searching for a subject portion corresponding to each block of each of the images except the reference image using a search range that is larger than a range corresponding to a displacement that is allowed for a subject portion in the reference image.

7. The apparatus according to claim 1, wherein the image processing section combines the images including the reference image by positioning the images so that subject portions overlap on one another based on a specific motion vector indicating a displacement smaller than a given distance among the respective motion vectors of the blocks acquired by the motion vector acquiring section.

8. The apparatus according to claim 1, further comprising:
   a selecting section configured to automatically select a plurality of images to be combined by the image processing section from the images acquired by the imaging section according to a given selection criterion.

9. The apparatus according to claim 8, wherein the selecting section automatically selects, as the images to be combined by the image processing section, images that are consecutive in time series from the images acquired by the imaging section according to the given selection criterion.

10. The apparatus according to claim 1, wherein the motion vector acquiring section acquires the motion vector for each of the selected blocks of the reference region without acquiring motion vectors of blocks included in a region outside of the reference region.

11. The apparatus according to claim 10, wherein the image processing section combines the images based only on the motion vectors for each of the selected blocks of the reference region acquired by the motion vector acquiring section.

12. A non-transitory computer-readable storage medium storing a program executable by a computer system to cause the computer system to perform functions comprising:
   acquiring a plurality of images that are consecutively taken in time series;
   employing one of the acquired images as a reference image and dividing the reference image into a plurality of blocks, and acquiring evaluation values indicating amounts of high-frequency components for the blocks, respectively;
   setting a region as a reference region, the region comprising blocks selected from among the plurality of blocks based on the acquired evaluation value for each block;
   acquiring a motion vector for each of the selected blocks of the reference region of the reference image; and combining images including the reference image and another image by positioning the images so as to overlap subject portions in each image based on the acquired motion vectors.

13. An imaging apparatus comprising:

an imaging section configured to acquire a plurality of images that are consecutively taken in time series by an imaging device;

a face detecting section configured to detect a face portion including a human face in the images acquired by the imaging section;

a reference region setting section configured to employ one of the images acquired by the imaging section as a reference image and divide the face portion detected in the reference image by the face detecting section into a plurality of blocks, and to set a region comprising the plurality of blocks as a reference region;

a motion vector acquiring section configured to acquire a motion vector for each block of the plurality of blocks of the reference region of the reference image set by the reference region setting section; and an image processing section configured to combine images including the reference image and another image by positioning the images so as to overlap subject portions in each image based on the motion vectors acquired by the motion vector acquiring section.

14. An imaging apparatus comprising:

an imaging section configured to acquire a plurality of images that are consecutively taken in time series by an imaging device;

a tracking section configured to track a target subject in the images acquired in time series by the imaging section;

a reference region setting section configured to employ one of the images acquired by the imaging section as a reference image and divide the target subject in the reference image into a plurality of blocks, and to set a region comprising the plurality of blocks as a reference region;

a motion vector acquiring section configured to acquire a motion vector for each block of the plurality of blocks of the reference region of the reference image set by the reference region setting section; and an image processing section configured to combine images including the reference image and another image by positioning the images so as to overlap subject portions in each image based on the motion vectors acquired by the motion vector acquiring section.

15. An imaging apparatus comprising:

an imaging section configured to acquire a plurality of images that are consecutively taken in time series by an imaging device;

a displacement acquiring section configured to acquire displacements of subject portions between the images acquired by the imaging section;

a reference region setting section configured to employ one of the images acquired by the imaging section as a reference image and divide an area corresponding to a main subject based on the displacements acquired by the displacement acquiring section into a plurality of blocks, and to set a region comprising the plurality of blocks as reference region;

a motion vector acquiring section configured to acquire a motion vector for each block of the plurality of blocks of the reference region of the reference image set by the reference region setting section; and an image processing section configured to combine images including the reference image and another image by positioning the images so as to overlap subject portions in each image based on the motion vectors acquired by the motion vector acquiring section.

16. The apparatus according to claim 15, wherein the displacement acquiring section acquires the displacements of the subject portions between at least two images included in the images, the two images being apart by more than a given time period in the time series; and wherein the reference region setting section employs one of the two images as the reference image and divides the area corresponding to the main subject into the plurality of blocks based on the displacements acquired by the displacement acquiring section to set the region including the plurality of blocks as the reference region.

17. The apparatus according to claim 16, wherein the reference region setting section divides a region into a plurality of blocks, the region corresponding to a subject portion whose displacement detected by the displacement detecting section is smaller than a threshold value, and sets the region including the plurality of blocks as the reference region.

18. The apparatus according to claim 15, wherein the displacement acquiring section acquires, on a block-by-block basis, accumulation values of the displacements of the subject portions acquired from pairs of images included in the images.

19. The apparatus according to claim 15, further comprising:

an information acquiring section configured to acquire angle-of-view movement information indicating a distance of an angle-of-view movement that is associated with a movement of the apparatus, wherein the reference region setting section divides a region into a plurality of blocks, the region corresponding to a subject portion whose displacement detected by the displacement detecting section is different from the movement distance indicated by the angle-of-view movement information acquired by the information acquiring section by more than a given range to set the region including the plurality of blocks as the reference region.

20. The apparatus according to claim 15, further comprising:

a distribution information acquiring section configured to acquire distribution information indicating a distribution of the displacements of subject portions acquired by the displacement acquiring section, wherein the reference region setting section divides the area corresponding to the main subject based on the distribution of the displacements indicated by the distribution information acquired by the distribution information acquiring section to set the region including the blocks as the reference region.

* * * * *